(12) United States Patent
Peker et al.

(10) Patent No.: US 6,843,496 B2
(45) Date of Patent: Jan. 18, 2005

(54) AMORPHOUS ALLOY GLIDING BOARDS

(75) Inventors: Atakan Peker, Aliso Viejo, CA (US); Scott Wiggins, Tampa, FL (US)

(73) Assignee: LiquidMetal Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/093,229

(22) Filed: Mar. 7, 2002

(65) Prior Publication Data

US 2002/0130489 A1 Sep. 19, 2002

Related U.S. Application Data

(60) Provisional application No. 60/274,340, filed on Mar. 7, 2001.

(51) Int. Cl.$^7$ .................................................. A63C 5/12
(52) U.S. Cl. ..................... 280/610; 280/602; 148/403
(58) Field of Search ................... 280/610, 601, 280/608, 602, 815, 14.22; 420/420, 422, 423; 148/403

(56) References Cited

U.S. PATENT DOCUMENTS

| | | | | |
|---|---|---|---|---|
| 5,171,509 A | * | 12/1992 | LeMasson et al. | 280/610 |
| 5,173,226 A | * | 12/1992 | Cazaillon et al. | 264/46.6 |
| 5,232,241 A | * | 8/1993 | Knott et al. | 280/607 |
| 5,273,696 A | * | 12/1993 | Cazaillon et al. | 264/45.2 |
| 5,288,344 A | * | 2/1994 | Peker et al. | 148/403 |
| 5,294,139 A | * | 3/1994 | Cazaillon et al. | 280/610 |
| 5,306,463 A | | 4/1994 | Horimura | |
| 5,324,368 A | * | 6/1994 | Masumoto et al. | 148/561 |
| 5,348,804 A | * | 9/1994 | Vasselin et al. | 428/423.1 |
| 5,356,573 A | * | 10/1994 | Kageyama | 264/25 |
| 5,368,659 A | * | 11/1994 | Peker et al. | 148/403 |
| 5,445,403 A | * | 8/1995 | Cazaillon et al. | 280/610 |
| 5,449,425 A | | 9/1995 | Renard et al. | |
| 5,458,358 A | * | 10/1995 | Garcin et al. | 280/610 |
| 5,496,053 A | * | 3/1996 | Abondance | 280/609 |
| 5,544,908 A | * | 8/1996 | Fezio | 280/610 |

(List continued on next page.)

FOREIGN PATENT DOCUMENTS

| | | | | |
|---|---|---|---|---|
| FR | 1124600 | | 10/1956 | |
| FR | 2611517 | | 9/1988 | |
| JP | 0256505 | * | 6/1984 | 280/610 |
| JP | 62-094182 | | 4/1987 | |
| JP | 62094182 A | * | 4/1987 | |
| JP | 2001303218 | | 10/2001 | |

OTHER PUBLICATIONS

Hays et al., "Microstructure Controlled Shear Band Pattern Formation and Enhanced Plasticity of Bulk Metallic Glasses Containing in Situ Formed Ductile Phase Dendrite Dispersions," *Physical Review Letters*, Mar. 27, 2000, pp. 2901–2904, vol. 84, No. 13, The American Physical Society.

(List continued on next page.)

*Primary Examiner*—Christopher P. Ellis
*Assistant Examiner*—Jeff Restifo
(74) *Attorney, Agent, or Firm*—Christie, Parker & Hale, LLP

(57) ABSTRACT

Gliding board devices and methods of making gliding board devices wherein at least a portion of the device is formed of a bulk amorphous alloy material are provided. The gliding board device including an upper reinforcing element that covers at least the upper surface of the device; a lower reinforcing element; a sliding element; a pair of running edges; and a core of filler material disposed between the upper and lower elements, wherein at least one of the upper reinforcing element, lower reinforcing element and pair of running edges are formed from an amorphous alloy.

45 Claims, 5 Drawing Sheets

U.S. PATENT DOCUMENTS

| | | | | |
|---|---|---|---|---|
| 5,599,036 A | * | 2/1997 | Abondance et al. | 280/602 |
| 5,618,359 A | * | 4/1997 | Lin et al. | 148/561 |
| 5,711,363 A | | 1/1998 | Scruggs et al. | |
| 5,735,975 A | * | 4/1998 | Lin et al. | 148/403 |
| 5,851,331 A | * | 12/1998 | Grenetier et al. | 156/235 |
| 5,896,642 A | * | 4/1999 | Peker et al. | 29/522.1 |
| 5,950,704 A | | 9/1999 | Johnson et al. | |
| 6,027,586 A | | 2/2000 | Masumoto et al. | |
| 6,073,954 A | * | 6/2000 | Guiguet et al. | 280/601 |
| 6,113,126 A | * | 9/2000 | Zanco et al. | 280/610 |
| 6,237,932 B1 | * | 5/2001 | Zanco et al. | 280/602 |
| 6,325,868 B1 | * | 12/2001 | Kim et al. | 148/403 |

OTHER PUBLICATIONS

Inoue et al., "Bulk Amorphous Alloys with High Mechanical Strength and Good Soft Magnetic Properties in Fe–TM–B (TM=IV–VIII Group Transition Metal) System," *App. Phys. Lett.*, Jul. 28, 1997, pp. 464–466, vol. 71, No. 4, American Institute of Physics.

Shen et al., "Bulk Glassy $Co_{43}Fe_{20}Ta_{5.5}B_{31.5}$ Alloy with High Glass–Forming Ability and Good Soft Magnetic Properties," *Materials Transactions*, 2001, pp. 2136–2139, vol. 42, No. 10, Rapid Publication.

* cited by examiner

AMORPHOUS ALLOY GLIDING BOARDS

CROSS-REFERENCE TO RELATED APPLICATION

This application is based on U.S. Application Ser. No. 60/274,340, filed Mar. 7, 2001, the disclosure of which is incorporated by reference.

FIELD OF THE INVENTION

This invention is related to gliding boards constructed of bulk solidifying amorphous alloys, and more particularly to the structures of skis and snowboards adopted to slide on snow and ice constructed of bulk solidifying amorphous alloys.

BACKGROUND OF THE INVENTION

Conventional skis and snowboards generally comprise a composite structure. For example, a typical ski and snowboard structure includes an upper element that covers the upper and lateral surfaces, and a lower element. The upper element may include load carrying elements to provide mechanical resistivity and rigidity, while the lower element may include a sliding sole and a metallic edge. Various filler materials such as foam are then used between the upper and lower elements as the structure body.

In such ski and snowboard devices, it is desirable that the upper element of the ski or snowboard comprise a structure having as light a weight as possible for ease of use while, retaining a high load carrying capability for durability. Accordingly, in conventional materials there is usually a trade-off between the mechanical resistance and load carrying ability of the ski/snowboard structure and the weight of the device.

Similarly, it is also desirable that the metallic edge of the lower element of the ski and/or snowboard retain a sharp and precise edge for better control. As such, the shaping of a precise edge and its durability against mechanical loads and environmental effects, and the cost of producing the precise edge become major concerns. In addition, in these precise edges must sustain high levels of strain during operation in order to keep their edge flat and precise. However, metallic edges made of conventional metals, such as stainless steel, can only sustain large strains via plastic deformation, resulting in a loss of the precision and flatness of the metallic edge.

Accordingly, a lightweight, inexpensive ski/snowboard design having a high load capacity and durable control edges would be desirable.

SUMMARY OF THE INVENTION

The present invention is directed to gliding board devices wherein at least a portion of the device is formed of a bulk amorphous alloy material. The gliding board device including an upper load carrying element that covers the upper and lateral surfaces of the device; a lower sliding element; and a filler material disposed between the upper and lower elements.

In one embodiment, the upper elements of the gliding board devices are made of one of either a bulk amorphous alloys or a bulk amorphous alloy composite.

In another embodiment, the metallic edge of the lower element of gliding board is made of one of either a bulk amorphous alloys or a bulk amorphous alloy composite. In one such embodiment, the bulk solidifying amorphous alloy elements is designed to sustain strains up to 2.0% without any plastic deformation. In another such embodiment the bulk amorphous alloy has a hardness value of about 5 GPa or more.

In still another embodiment of the invention, the bulk amorphous alloys or composites are formed into complex near-net shapes either by casting or molding. In still yet another embodiment, the bulk amorphous alloy or composite gliding board structures are obtained in the cast and/or molded form without any need for subsequent process such as heat treatment or mechanical working.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

The present invention is directed to ski and snowboard devices wherein at least a portion of the device is formed of a bulk amorphous alloy material, referred to herein as amorphous alloy gliding board devices.

Figure 1:
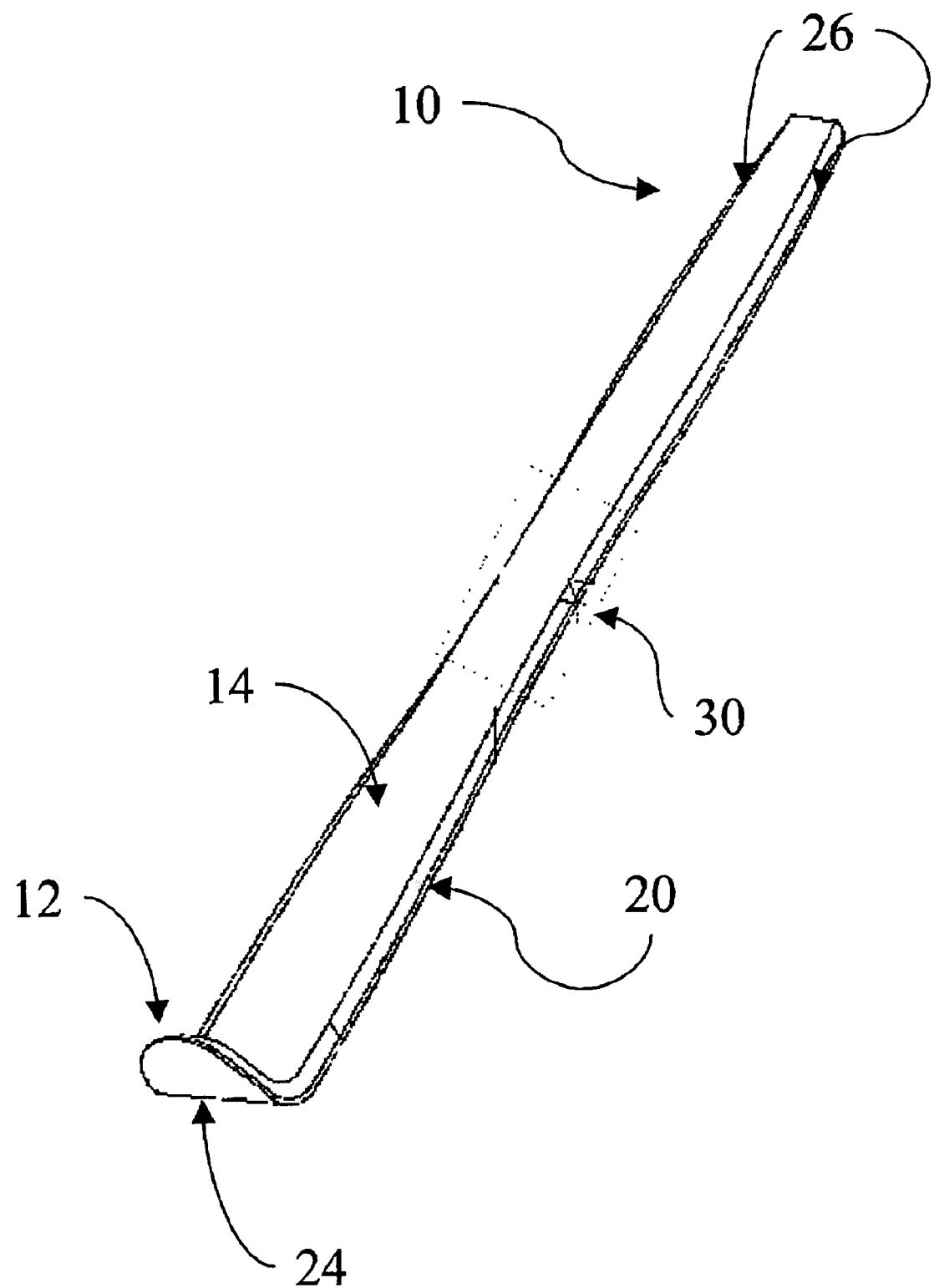
FIG. 1 shows a schematic of a gliding board according to one embodiment of the current invention.

As shown in FIGS. 1 and 2, the gliding board devices of the present invention generally comprise an elongated beam 10, whose front end is turned up at the toe region 12. The elongated beam 10 of the gliding boards of the current invention generally comprise an upper element 14 that interacts and covers at least an upper 16, and in some instances a lateral surface 18 of the device, and a lower element 20. Various filler materials 21, such as foam are then used between the upper and lower elements as the structure body or core.

The core 21 of the gliding board extends substantially along its entire length. The core may be of any appropriate type; it is especially obtained in a foam or fibrous material such as wood, or reciprocally adhered wooden slats, or any other known structure, an alveolar structure, for example. Sectionally, the core may have any suitable shape and the dimensions of the transverse section of the core can be variable along the length of the ski. Although specific embodiments of the invention are shown in FIGS. 1 and 2, the structure, shape and dimensions of the core are non-limiting for the invention.

The upper element 14 may include an upper load carrying element 22 to provide mechanical resistivity and rigidity to the device, while the lower element 20 may include a bottom sliding sole 24, side mounted metallic running edges 26 and an internal lower load carrying element 28.

It should be understood that it is desirable that the upper and lower load carrying elements 22 and 28 of the gliding board comprise a structure with high load carrying capability and yet still be made of a lightweight material. Accordingly, in one embodiment of the present invention one or both of the upper and/or lower load carrying elements of gliding boards are made of bulk amorphous alloys and composites such that the ski and/or snowboard device has better mechanical resistance and load carrying ability due to the amorphous alloy material's higher yield strength and higher elastic modulus per given weight.

In such an embodiment, the user's weight is distributed more evenly and intimately to the sliding lower element, which in result provides better speed and control. In another embodiment, the bulk amorphous alloys and/or composites are designed to provide the device with the ability to absorb and dissipate vibrations from shock and impact due to the high internal friction coefficients and the interfaces between the matrix and reinforcements, such that a smooth and comfortable ride can be provided.

It should also be understood that it is desirable that the metallic running edge 26 of the lower element 20 of the gliding board be a sharp and precise edge for better control. Accordingly, in one embodiment of the invention the metallic running edge of the lower element is formed of an amorphous alloy such that the lower element forms a durable precisely formed edge against mechanical loads and environmental effects. In one embodiment of the invention the precise metallic edges of the lower element are designed to sustain high levels of strain during operation in order to keep their edge flat and precise. In one such embodiment the metallic edge is designed such that it does not undergo plastic deformation at strain levels of at least about 1.2%. In another embodiment the lower element is designed to sustain strains up to 2.0% without any plastic deformation. For example, in one embodiment the bulk amorphous alloy has a hardness value as high as 5 GPa or more. In such an embodiment, the lower element of the ski and/or snowboard device, and specifically the metallic edge, is designed to provide improved precision and higher durability.

Any bulk amorphous alloys may be used in the current invention. Bulk solidifying amorphous alloys refer to the family of amorphous alloys that can be cooled at cooling rates of as low as 500 K/sec or less, and retain their amorphous atomic structure substantially. Such bulk amorphous alloys can be produced in thicknesses of 0.5 mm or more, substantially thicker than conventional amorphous alloys having a typical cast thickness of 0.020 mm, and which require cooling rates of $10^5$ K/sec or more. Exemplary embodiments of suitable amorphous alloys are disclosed in U.S. Pat. Nos. 5,288,344; 5,368,659; 5,618,359; and 5,735,975; all of which are incorporated herein by reference.

One exemplary family of suitable bulk solidifying amorphous alloys are described by the following molecular formula: $(Zr,Ti)_a(Ni,Cu,Fe)_b(Be,Al,Si,B)_c$, where a is in the range of from about 30 to 75, b is in the range of from about 5 to 60, and c in the range of from about 0 to 50 in atomic percentages. It should be understood that the above formula by no means encompasses all classes of bulk amorphous alloys. For example, such bulk amorphous alloys can accommodate substantial concentrations of other transition metals, up to about 20% atomic percentage of transition metals such as Nb, Cr, V, Co. One exemplary bulk amorphous alloy family is defined by the molecular formula: $(Zr,Ti)_a(Ni,Cu)_b(Be)_c$, where a is in the range of from about 40 to 75, b is in the range of from about 5 to 50, and c in the range of from about 5 to 50 in atomic percentages. One exemplary bulk amorphous alloy composition is $Zr_{41}Ti_{14}Ni_{10}Cu_{12.5}Be_{22.5}$.

Although specific bulk solidifying amorphous alloys are described above, any suitable bulk amorphous alloy may be used which can sustain strains up to 1.5% or more without any permanent deformation or breakage; and/or have a high fracture toughness of about 10 ksi-√in or more, and more specifically of about 20 ksi-√in or more; and/or have high hardness values of about 4 GPa or more, and more specifically about 5.5 GPa or more. In comparison to conventional materials, suitable bulk amorphous alloys have yield strength levels of up to about 2 GPa and more, exceeding the current state of the Titanium alloys. Furthermore, the bulk amorphous alloys of the invention have a density in the range of 4.5 to 6.5 g/cc, and as such they provide high strength to weight ratios. In addition to desirable mechanical properties, bulk solidifying amorphous alloys exhibit very good corrosion resistance.

Another set of bulk-solidifying amorphous alloys are compositions based on ferrous metals (Fe, Ni, Co). Examples of such compositions are disclosed in U.S. Pat. No. 6,325,868, (A. Inoue et. al., Appl. Phys. Lett., Volume 71, p 464 (1997)), (Shen et. al., Mater. Trans., JIM, Volume 42, p 2136 (2001)), and Japanese patent application 2000126277 (Publ. # .2001303218 A), incorporated herein by reference. One exemplary composition of such alloys is $Fe_{72}Al_5Ga_2P_{11}C_6B_4$. Another exemplary composition of such alloys is $Fe_{72}Al_7Zr_{10}Mo_5W_2B_{15}$. Although, these alloy compositions are not as processable as Zr-base alloy systems, these materials can be still be processed in thicknesses around 0.5 mm or more, sufficient enough to be utilized in the current disclosure. In addition, although the density of these materials is generally higher, from 6.5 g/cc to 8.5 g/cc, the hardness of the materials is also higher, from 7.5 GPA to 12 GPa or more making them particularly attractive. Similarly, these materials have elastic strain limit higher than 1.2% and very high yield strengths from 2.5 GPa to 4 GPa.

In general, crystalline precipitates in bulk amorphous alloys are highly detrimental to their properties, especially to the toughness and strength, and as such generally preferred to a minimum volume fraction possible. However, there are cases in which ductile metallic crystalline phases precipitate in-situ during the processing of bulk amorphous alloys, these ductile precipitates can be beneficial to the properties of bulk amorphous alloys especially to the toughness and ductility. Accordingly, bulk amorphous alloys comprising such beneficial precipitates are also included in the current invention. One exemplary case is disclosed in (C. C. Hays et. al, Physical Review Letters, Vol. 84, p 2901, 2000), which is incorporated herein by reference.

Although pure bulk amorphous alloys are described above, they can also be produced in a variety of composite structures with other materials such as, for example, SiC, diamond, carbon fiber and metals such as Molybdenum. A variety of methods can be utilized to form these bulk amorphous matrix composites such as melt infiltration and thermoplastic forming. Although only a few examples are provided above, it should be understood that because the bulk amorphous matrix composites can comprise a variety of reinforcements, such as carbon fiber, the mechanical properties of these materials can be tailored for specific needs. For example, using the reinforcements of Carbon fiber such as up to 50% by volume, the density of the material can be reduced to as low as 3.5 g/cc and the modulus of elasticity increased as high as 300 Gpa, providing a high specific stiffness (young modulus/density). In addition, higher volume fractions of carbon fiber and other materials such as SiC particulates and fibers can further increase these properties. In one exemplary embodiment, a mixed composite of bulk amorphous alloys can be made with combinations of carbon fibers, SiC particulates and other metals such as Molybdenum to provide exceptional combinations of flexural strengths up to about 5 GPa and more, toughness, and high modulus at a density of from about 3 g/cc up to 6 g/cc.

Although the above discussion has focused on the use of amorphous alloy materials in the gliding boards of the current invention, it should be understood that conventional materials are also used in the construction of the other portions of the gliding boards. For example, the upper element 14 preferably includes one or more decorative and protective layers generally made of a thermoplastic material, such as, a polyurethane, a polycarbonate, a polyamide, a polyamide copolymer, etc external to the upper load carrying element 22. The sliding sole 24 preferably comprises a low friction polymer, such as, polyethylene. Finally, the filler core 21 is preferably made of a synthetic thermohardenable foam surrounded by an adhesive film to provide adhesion between the core and the upper and lower elements.

In addition, although the above discussion has focussed generally on the overall construction of a gliding board it should be understood that these elements can be combined in a number of different forms under the current invention.

Figure 2A:
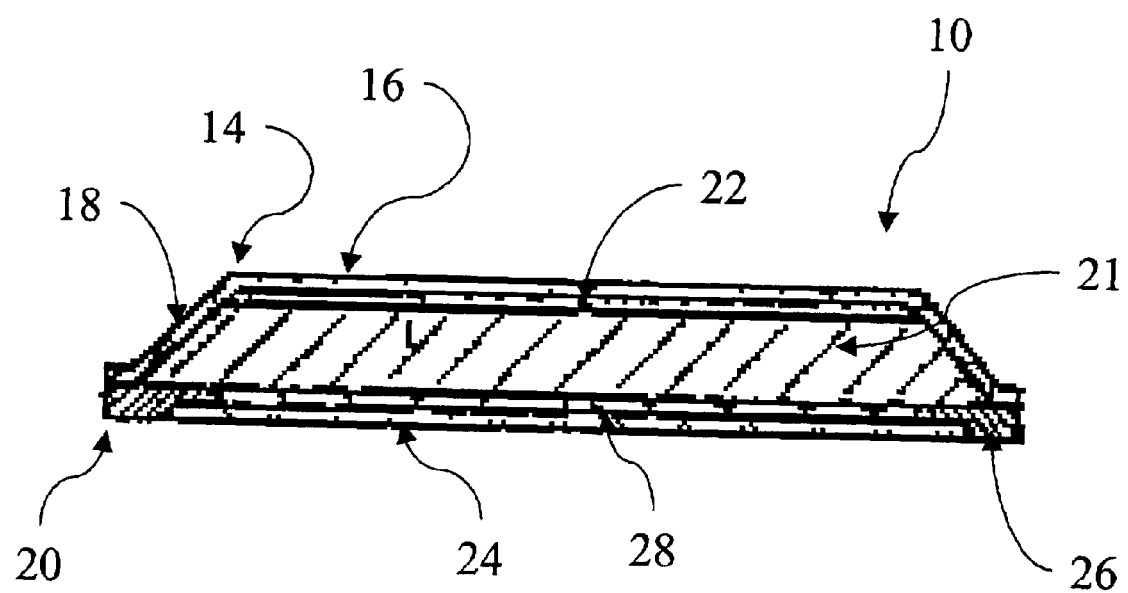
FIG. 2a shows a cross-section of a sandwich-structure gliding board according to one embodiment of the current invention.
Figure 2B:
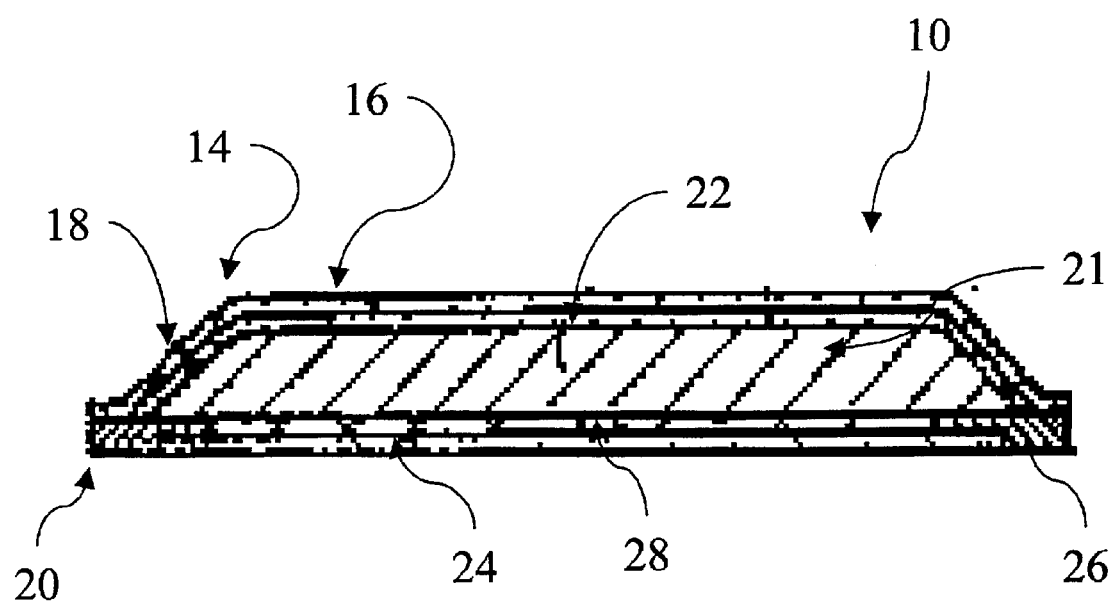
FIG. 2b shows a cross-section of a box-structure gliding board according to one embodiment of the current invention.
Figure 2C:
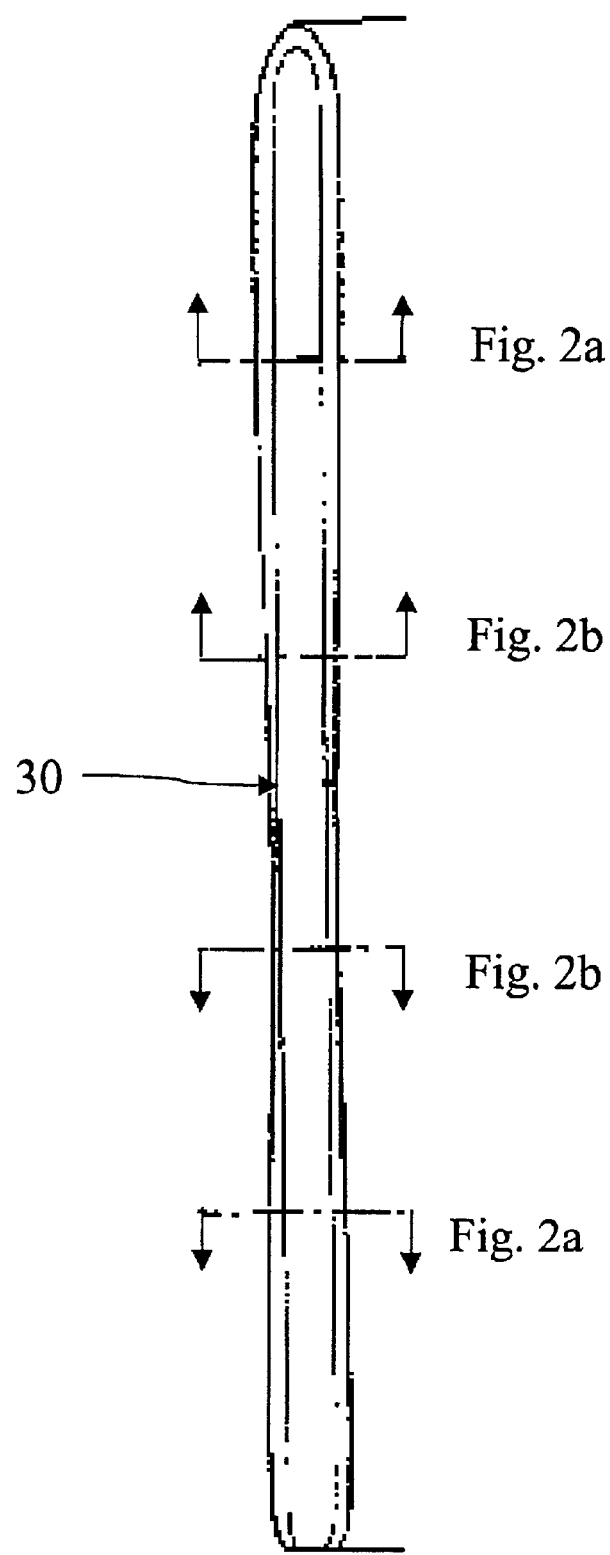
FIG. 2c shows a cross-section of a combination sandwich/box-structure gliding board according to one embodiment of the current invention.

For example, as shown best in FIGS. 2a to 2c, the gliding boards of the invention are obtained according to one of several conventional composite structures depending on the preferred type of use. These composite structures include: a sandwich structure, a box structure, and a combination sandwich/box structure.

As shown in FIG. 2a, a gliding board having a sandwich structure has a central core 21 which comprises a fibrous or alveolar material, for example. The core is covered on the top and bottom by the upper 14 and lower 20 elements including reinforcement layers. An exemplary embodiment of such a structure is described in French Patent Publication No. 1,124,600, which is incorporated herein by reference. Although such sandwich-structure gliding boards generally provide operation that is both easy and forgiving, such gliding boards have the disadvantage of not possessing high lateral gripping qualities.

As shown in FIG. 2b, a gliding board having a box structure has a core 21 which can be made of fibrous or alveolar material. The core is covered on its top, bottom and lateral surfaces by the upper 14 and lower 20 elements including reinforcement walls which constitute a box. An exemplary box-structure gliding board is also described in French Patent Publication No. 1,124,600. Such a structure provides the ski with greater torsional rigidity. Although such a box-type gliding board has high gripping qualities, such skis are not as easy to operate as the sandwich structure skis.

Finally, FIG. 2c illustrates a combination box/sandwich-type gliding board according to the present invention. It comprises a longitudinal beam with a turned up front end to form the shovel, a gliding sole and lateral running edges. It is characterized by the fact that it has a box type structure along one portion of its length, with a central core surrounded by an upper reinforcement wall, two lateral reinforcement walls and a lower reinforcement wall, and along another portion of its length, separate from the first portion, it has a sandwich type structure, with a central core, an upper reinforcement wall and a lower reinforcement wall.

Although the elongated beam 10 of the above structures is of a relatively simple construction, it will be understood that the beam may be designed such that the beam characteristics, i.e., beam thickness and edge inclination, may vary along the length of the gliding board. For example, French Patent Publication No. 2,611,517 (which is incorporated herein by reference) describes a gliding board wherein the thickness of the elongated beam towards the ends is less than in the middle sole zone, and whose edge inclination, with respect to a horizontal plane, is lesser towards the ends and greater in the middle sole zone. Such variations in shape characteristics tend to provide the ski with greater torsional rigidity in the central zone, and greater flexibility towards the ends of the ski According to another variation, the ski could have a box structure in its central and rear zones, and a sandwich structure in its front zone. It goes without saying that the different embodiment variations of the previously described reinforcement walls apply equally for these different implementations of the invention.

A central portion 30 of the gliding board is referenced in FIG. 1. It is in this central portion that the binding elements are traditionally assembled on the gliding board. It should be understood, however, that while the central portion 30, is the standard mounting zone, such zones are not limited to the borders of this central portion, and can extend beyond, frontwardly and rearwardly.

Figure 3:
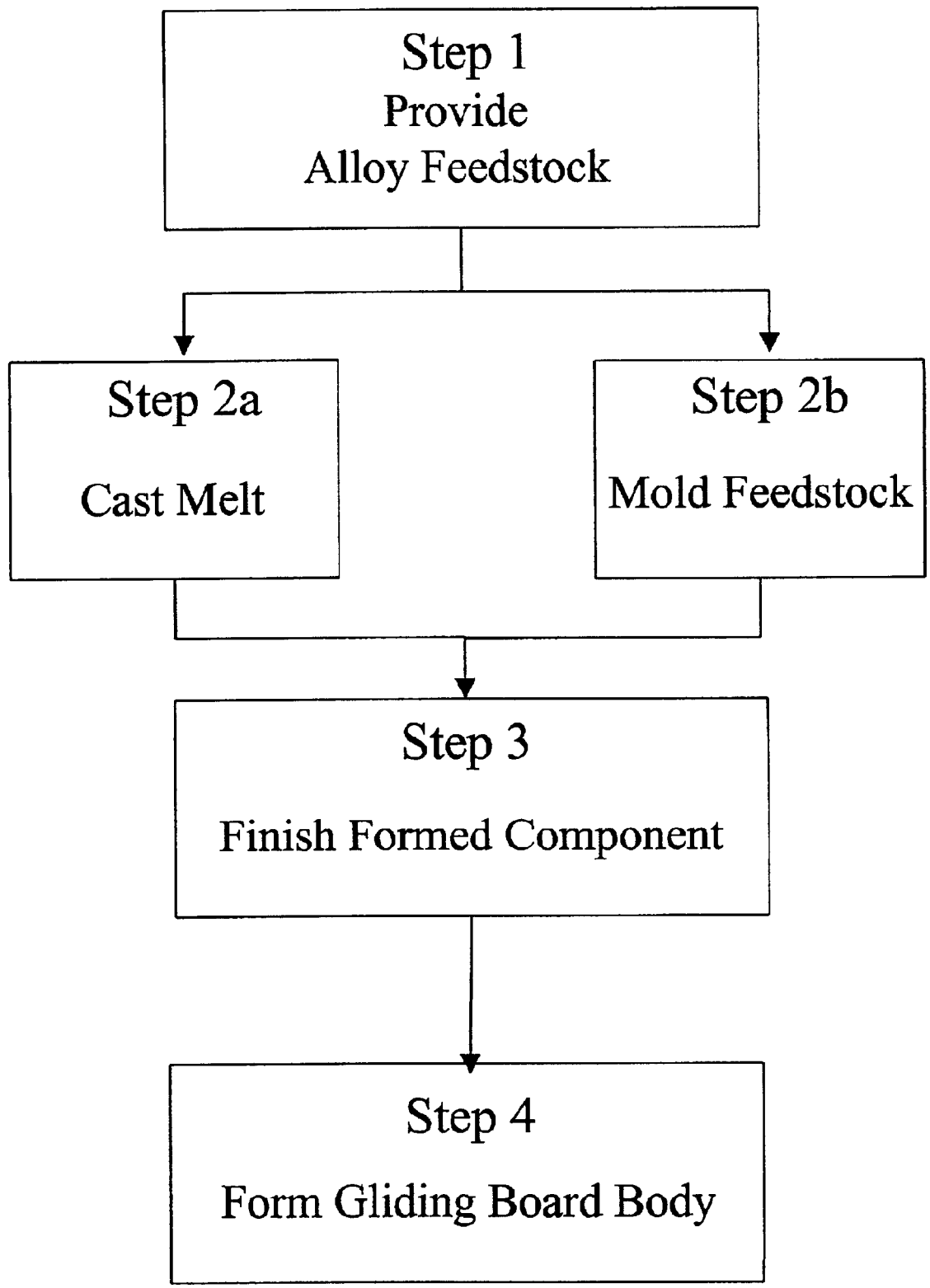
FIG. 3 shows a flow-chart of a process for making the gliding board devices shown in FIGS. 1 and 2.

The invention is also directed to a process for forming the amorphous gliding boards discussed above The invention is also directed to methods of manufacturing cutting tools from bulk amorphous alloys. FIG. 3 shows a flowchart for a process of forming the amorphous alloy articles of the invention comprising: providing a feedstock (Step 1), in the case of a molding process, this feedstock is a solid piece in the amorphous form, while in the case of a casting process, this feedstock is a molten liquid alloy above the melting temperatures; then either casting the feedstock from at or above the melt temperature into the desired shape while cooling (Step 2a), or heating the feedstock to the glass transition temperature or above and molding the alloy into the desired shape (Step 2b). Any suitable casting process may be utilized in the current invention, such as, permanent mold casting, die casting or a continuous process such as planar flow casting. One such die-casting process is disclosed in U.S. Pat. No. 5,711,363, which is incorporated herein by reference. Likewise, a variety of molding operations can be utilized, such as, blow molding (clamping a portion of feedstock material and applying a pressure difference on opposite faces of the unclamped area), die-forming (forcing the feedstock material into a die cavity), and replication of surface features from a replicating die. U.S. Pat. Nos. 6,027,586; 5,950,704; 5,896,642; 5,324,368; 5,306,463; (each of which is incorporated by reference in its entirety) disclose methods to form molded articles of amorphous alloys by exploiting their glass transition properties. Although subsequent processing steps may be used to finish the amorphous alloy articles of the current invention (Step 3), it should be understood that the mechanical properties of the bulk amorphous alloys and composites can be obtained in the as cast and/or molded form without any need for subsequent process such as heat treatment or mechanical working. In addition, in one embodiment the bulk amorphous alloys and their composites are formed into complex near-net shapes in the two-step process. In such an embodiment, the precision and near-net shape of casting and moldings is preserved.

Finally, the gliding board body is formed around the amorphous alloy components (Step 4) using conventional gliding board manufacturing techniques. For example, a mold casting method for forming a gliding board according to the present invention is disclosed in U.S. Pat. No. 5,449,425, which is incorporated herein by reference.

Although relatively simple ski and snowboard designs are shown in FIGS. 1 and 2, it should be understood that utilizing such a near-net shape process for forming structures made of the bulk amorphous metals and composites, more sophisticated and advanced designs of ski and snowboard composite structures having the improved mechanical properties could be achieved.

Although specific embodiments are disclosed herein, it is expected that persons skilled in the art can and will design alternative amorphous alloy ski and snowboard devices and methods to produce the amorphous alloy ski and snowboard devices that are within the scope of the following claims either literally or under the Doctrine of Equivalents.

What is claimed is:

1. A board for gliding on snow, the board comprising:
a longitudinally extending core having proximal and distal ends;
a gliding sole affixedly positioned beneath said core and extending substantially from the proximal to the distal end of the core; and
at least one load carrying structural element selected from the group consisting of an upper reinforcement layer affixedly positioned above said core and extending substantially from the proximal to the distal end of the core, a lower reinforcement layer affixedly positioned between said core and said gliding sole and extending substantially from the proximal to the distal end of the core, a pair of running edges affixedly positioned at opposite lateral sides of the gliding sole and extending substantially from the proximal to the distal end of the core;
wherein at least one of the at least one load carrying structural element is formed from a bulk-solidifying amorphous alloy material, and wherein
wherein the bulk-solidifying amorphous alloy has an elastic limit up to 1.2% or more and a critical cooling rate of 1000 K/s or less.

2. The gliding board as described in claim 1, wherein the bulk-solidifying amorphous alloy is described by the following molecular formula: (Zr,Ti)a(Ni,Cu, Fe)b(Be,Al,Si,B)c, wherein "a" is in the range of from about 30 to 75, "b" is in the range of from about 5 to 60, and "c" in the range of from about 0 to 50 in atomic percentages.

3. The gliding board as described in claim 1, wherein the bulk-solidifying amorphous alloy is described by the following molecular formula: (Zr,Ti)a(Ni,Cu)b(Be)c, wherein "a" is in the range of from about 40 to 75, "b" is in the range of from about 5 to 50, and "c" in the range of from about 5 to 50 in atomic percentages.

4. The gliding board as described in claim 1, wherein the bulk-solidifying amorphous alloy is described by the. following molecular formula: Zr41Ti14Ni10Cu12.5Be22.5.

5. The gliding board as described in claim 1, wherein the bulk-solidifying amorphous alloy can sustain strains up to 2.0% or more without any permanent deformation or breakage.

6. The gliding board as described in claim 1, wherein the bulk-solidifying amorphous alloy has a high fracture toughness of at least about 10 ksi-√in.

7. The gliding board as described in claim 1, wherein the bulk-solidifying amorphous alloy has a high fracture toughness of at least about 20 ksi-√in.

8. The gliding board as described in claim 1, wherein the bulk-solidifying amorphous alloy has a high hardness value of at least about 4 GPa.

9. The gliding board as described in claim 1, wherein the bulk-solidifying amorphous alloy has a high hardness value of at least about 5.5 GPa.

10. The gliding board as described in claim 1, wherein the, bulk-solidifying amorphous alloy has a density in the range of about 4.5 to 6.5 g/cc.

11. The gliding board as described in claim 1, wherein the bulk-solidifying amorphous alloy further comprises at least one composite material is selected from the group consisting of: SiC, diamond, carbon fiber and Molybdenum.

12. The gliding board as described in claim 11, wherein the composite material is carbon fiber in a concentration up to 50% by volume.

13. The gliding board as described in claim 1, wherein the running edge is formed from the bulk-solidifying amorphous alloy and is designed such that it does not undergo plastic deformation at strain levels of at least about 1.2%.

14. The gliding board as described in claim 1, wherein at least the running edge is formed from the bulk-solidifying amorphous alloy and is designed such that it does not undergo plastic deformation at strain levels of at least about 2.0%.

15. The gliding board as described in claim 1, further comprising an outer shell affixedly positioned to enclose the core and upper and lower reinforcement layers.

16. The gliding board as described in claim 15, wherein the outer shell is formed from a material selected from the group consisting of: a polyurethane, a polycarbonate, a polyamide and a polyamide copolymer.

17. The gliding board as described in claim 1, wherein the gliding board has a structure selected from the group consisting of: sandwich, box, and combination.

18. The gliding board as described in claim 1, wherein the gliding sole is formed from polyethylene.

19. The gliding board as described in claim 1, wherein the core is formed from a thermohardenable foam.

20. The gliding board as described in claim 1, wherein the core is further surrounded by an adhesive film for fixedly attaching components thereto.

21. The gliding board as described in claim 1, wherein a set of binding elements for securing a boot to the gliding board are mounted above the upper reinforcing layer.

22. The gliding board as described in claim 1, wherein the gliding board is in the form of one of either a ski or a snowboard.

23. The gliding board as described in claim 1, wherein, the bulk-solidifying amorphous alloy is based on ferrous metals wherein the elastic limit of the bulk-solidifying amorphous alloy is about 1.5% and higher, and the hardness of the bulk-solidifying amorphous alloy is about 7.5 Gpa and higher.

24. The gliding board as described in claim 23, wherein at least a portion of the at least one load carrying structural element formed from the bulk-solidifying amorphous alloy has a thickness of about 0.5 mm or more.

25. The gliding board as described in claim 1, wherein the bulk-solidifying amorphous alloy is described by a molecular formula selected from the group consisting of: $Fe_{72}Al_5Ga_2P_{11}C_5B_4$ and $Fe_{72}Al_7Zr_{10}Mo_5W_2B_{15}$.

26. The gliding board as described in claim 1, wherein the bulk-solidifying amorphous alloy further comprises a ductile metallic crystalline phase precipitate.

27. The gliding board as described in claim 1, wherein at least a portion of the at least one load carrying structural element formed from the bulk-solidifying amorphous alloy has a thickness of about 0.5 mm or more.

28. A board for gliding on snow, the board comprising:
a longitudinally extending core having proximal and distal ends;
a gliding sole affixedly positioned beneath said core and extending substantially from the proximal to the distal end of the core; and
a plurality of load carrying structural elements including an upper reinforcement layer affixedly positioned above said core and extending substantially from the proximal to the distal end of the core, a lower reinforcement layer affixedly positioned between said core and said gliding sole and extending substantially from the proximal to the distal end of the core, a pair of running edges affixedly positioned at opposite lateral sides of the gliding sole and extending substantially from the proximal to the distal end of the core;
wherein each of the load carrying structural elements are formed from a bulk-solidifying amorphous alloy material, and wherein the bulk-solidifying amorphous alloy has an elastic limit up to 1.2% or more and a critical cooling rate of 1000 K/s or less.

29. A board for gliding on snow, the board comprising:
a longitudinally extending core having proximal and distal ends;
a gliding sole affixedly positioned beneath said core and extending substantially from the proximal to the distal end of the core; and
a plurality of load carrying structural elements including an upper reinforcement layer affixedly positioned above said core and extending substantially from the proximal to the distal end of the core, a lower reinforcement layer affixedly positioned between said core and said gliding sole and extending substantially from the proximal to the distal end of the core, a pair of running edges affixedly positioned at opposite lateral sides of the gliding sole and extending substantially from the proximal to the distal end of the core;
wherein both the upper reinforcement layer and the lower reinforcement layer are formed from a bulk-solidifying amorphous alloy material, and wherein the bulk-solidifying amorphous alloy has an elastic limit up to 1.2% or more and a critical cooling rate of 1000 K/s or less.

30. A board for gliding on snow, the board comprising:
a longitudinally extending core having proximal and distal ends;
a gliding sole affixedly positioned beneath said core and extending substantially from the proximal to the distal end of the core; and
a plurality of load carrying structural element including an upper reinforcement layer affixedly positioned above said core and extending substantially from the proximal to the distal end of the core, a lower reinforcement layer affixedly positioned between said core and said gliding sole and extending substantially from the proximal to the distal end of the core, a pair of running edges affixedly positioned at opposite lateral sides of the gliding sole and extending substantially from the proximal to the distal end of the core;
wherein both the pair of running edges are formed from a bulk-solidifying amorphous alloy material, and wherein the bulk-solidifying amorphous alloy has an elastic limit up to 1.2% or more and a critical cooling rate of 1000 K/s or less.

31. A method of manufacturing a gliding board comprising:
preparing a core;
providing a gliding sole;
fixedly attaching said gliding sole beneath said core;
forming at least one load carrying structural element selected from the group consisting of an upper reinforcing layer, a lower reinforcing layer, and a pair of running edges from a bulk-solidifying amorphous alloy material, and wherein the bulk-solidifying amorphous alloy has an elastic limit up to 1.2% or more and a critical cooling rate of 1000 K/s or less; and
fixedly attaching said load carrying structural element to said gliding board, wherein the upper and lower reinforcing layers are attached to said core and said pair of running edges are fixedly attached to opposite lateral sides of said gliding sole.

32. The method as described in claim 31, wherein the bulk-solidifying amorphous alloy is described by the, following molecular formula: $(Zr,Ti)_a(Ni,Cu, Fe)_b(Be,Al,Si, B)_c$, wherein "a" is in the range of from about 30 to 75, "b" is in the range of from about 5 to 60, and "c" in the range of from about 0 to 50 in atomic percentages.

33. The method as described in claim 31, wherein the bulk-solidifying amorphous alloy is described by the following molecular formula: $(Zr,Ti)_a(Ni,Cu)_b(Be)_c$, wherein "a" is in the range of from about 40 to 75, "b" is in the range of from about 5 to 50, and "c" in the range of from about 5 to 50 in atomic percentages.

34. The method as described in claim 31, wherein the bulk-solidifying amorphous alloy is described by the following molecular formula: $Zr_{41}Ti_{14}Ni_{10}Cu_{12.5}Be_{22.5}$.

35. The gliding board as described in claim 31, wherein the bulk-solidifying amorphous alloy further comprises at least one composite material is selected from the group consisting of: SiC, diamond, carbon fiber and Molybdenum.

36. The method as described in claim 31, wherein the core is formed of a thermohardenable foam.

37. The method as described in claim 31, wherein the step of preparing the core further comprises applying an outer layer of adhesive to the core.

38. The method as described in claim 31, wherein the step of forming the upper reinforcing layer, the lower reinforcing layer, and the pair of running edges comprises one of the methods selected from the group consisting of: molding, casting and thermoplastic casting.

39. The method as described in claim 31, wherein the gliding sole is formed from polyethylene.

40. The method as described in claim 31, further comprising encapsulating said upper and lower reinforcing layers and said core in a protective outer shell.

41. The method as described in claim 40, wherein said outer shell is formed from a material selected from the group consisting of: a polyurethane, a polycarbonate, a polyamide and a polyamide coploymer.

42. The method as described in claim 31, further comprising mounting a set of binding elements for securing a boot to the gliding board above the upper reinforcing layer.

43. The gliding board as described in claim 31, wherein the bulk-solidifying amorphous alloy is based on ferrous metals wherein the elastic limit of the bulk-solidifying amorphous alloy is about 1.5% and higher, and the hardness of the bulk-solidifying amorphous alloy is about 7.5 Gpa and higher.

44. The gliding board as described in claim 31, wherein the bulk-solidifying amorphous alloy is described by a molecular formula selected from the group consisting of: $Fe_{72}Al_5Ga_2P_{11}C_6B_4$ and $Fe_{72}Al_7Zr_{10}Mo_5W_2B_{15}$.

45. The gliding board as described in claim 31, wherein the bulk-solidifying amorphous alloy further comprises a ductile metallic crystalline phase precipitate.

* * * * *